United States Patent [19]

Early

[11] Patent Number: 4,503,581

[45] Date of Patent: Mar. 12, 1985

[54] AUTOMATIC FLOOR TREATING APPARATUS

[76] Inventor: Susan E. Early, 2938 Fox Tail Ct., Woodbridge, Va. 22192

[21] Appl. No.: 473,545

[22] Filed: Mar. 9, 1983

[51] Int. Cl.$^3$ .............................................. A47L 9/00
[52] U.S. Cl. ...................................... 15/319; 15/340; 180/6.2; 180/168
[58] Field of Search ................... 15/319, 340; 180/6.2, 180/168; 104/166

[56] References Cited

U.S. PATENT DOCUMENTS

| | | | |
|---|---|---|---|
| 1,935,158 | 11/1933 | Lumley | 15/319 |
| 3,713,505 | 1/1973 | Muller | 15/319 X |
| 4,223,753 | 9/1980 | Bradbury | 180/6.2 |

FOREIGN PATENT DOCUMENTS

| | | | |
|---|---|---|---|
| 722755 | 1/1932 | France | 15/319 |

*Primary Examiner*—Chris K. Moore
*Attorney, Agent, or Firm*—Dennis H. Lambert

[57] ABSTRACT

Apparatus for automatically treating a floor or material on a floor is described in which a support carrying means for treating the floor is provided with a first set of wheels for moving the support in one direction or the opposite direction of a first path of motion and a second set of wheels is positioned at a right angle to the wheels of the first set of wheels for moving the support in one direction at a right angle to the first path of motion. This second set of wheels is movably mounted with respect to the support so that the second wheels can be forced downwardly to bear against the floor and thereby lift the support from the first wheels, and raised upwardly to allow the first wheels to contact the floor. Means are provided to raise and lower the second set of wheels, means are provided to drive the first and second set of wheels, and sensing means to detect an obstruction at each end of the support with respect to the first path of motion are also provided. These sensing means are operative to control the drive for the first and second set of wheels.

7 Claims, 5 Drawing Figures

AUTOMATIC FLOOR TREATING APPARATUS

DESCRIPTION

FIELD OF INVENTION

This invention relates to automatic floor treating apparatus in which the floor treating mechanism is carried on a motorized support which is automatically guided back and forth across the floor, the support moving laterally in one direction whenever an obstruction is encountered.

BACKGROUND ART

Floors take a great deal of time to clean or polish or vacuum, and with today's fast-paced and time-demanding lifestyles, an apparatus that would accomplish the work unattended would be greatly appreciated.

This invention is concerned with the provision of automatically guided floor treating apparatus to carry out the task outlined above.

DISCLOSURE OF INVENTION

In accordance with this invention, the apparatus for automatically treating a floor or material on a floor (such as a rug) comprises, a support, means for treating the floor carried by said support, said support carrying a first set of wheels for moving said support in one direction or the opposite direction of a first path of motion, a second set of wheels positioned at a right angle to the wheels of said first set of wheels for moving said support in one direction at a right angle to said first path of motion, said second wheels being movably mounted with respect to the support whereby said second wheels may be forced downwardly to bear against the floor and thereby lift the support and first wheels upwardly and out of contact with the floor, and said second wheels may be raised upwardly to allow the first wheels to contact the floor. Means are provided to raise and lower the second set of wheels and means are also provided to drive the first and second set of wheels. Also, sensing means are provided to detect an obstruction at each end of the support with respect to the first path of motion, these sensing means being operative to control the drive for the first and second sets of wheels.

In a preferred construction, first motor means are provided for powering the first set of wheels in the opposite direction every time the motor means is turned on and second motor means are provided for powering the second set of wheels. The sensing means to detect an obstruction at each end of the support with respect to the first path of motion are operative to turn the second motor means on, and, directly or indirectly, to turn the first motor means off. Means are provided powered by the second motor means to force the second set of wheels downwardly into operative association with the floor and to maintain this operative association for a predetermined period of time. Means are also provided to elevate the second set of wheels, and switch means are present which are operative when the second set of wheels is elevated to turn the first motor means on, and, directly or indirectly, to turn the second motor means off.

The invention will be more fully understood from the accompanying drawings in which the treating mechanism portion of the apparatus is diagrammatically shown because it has not been changed with respect to the prior art. In these drawings.

Figure 4:
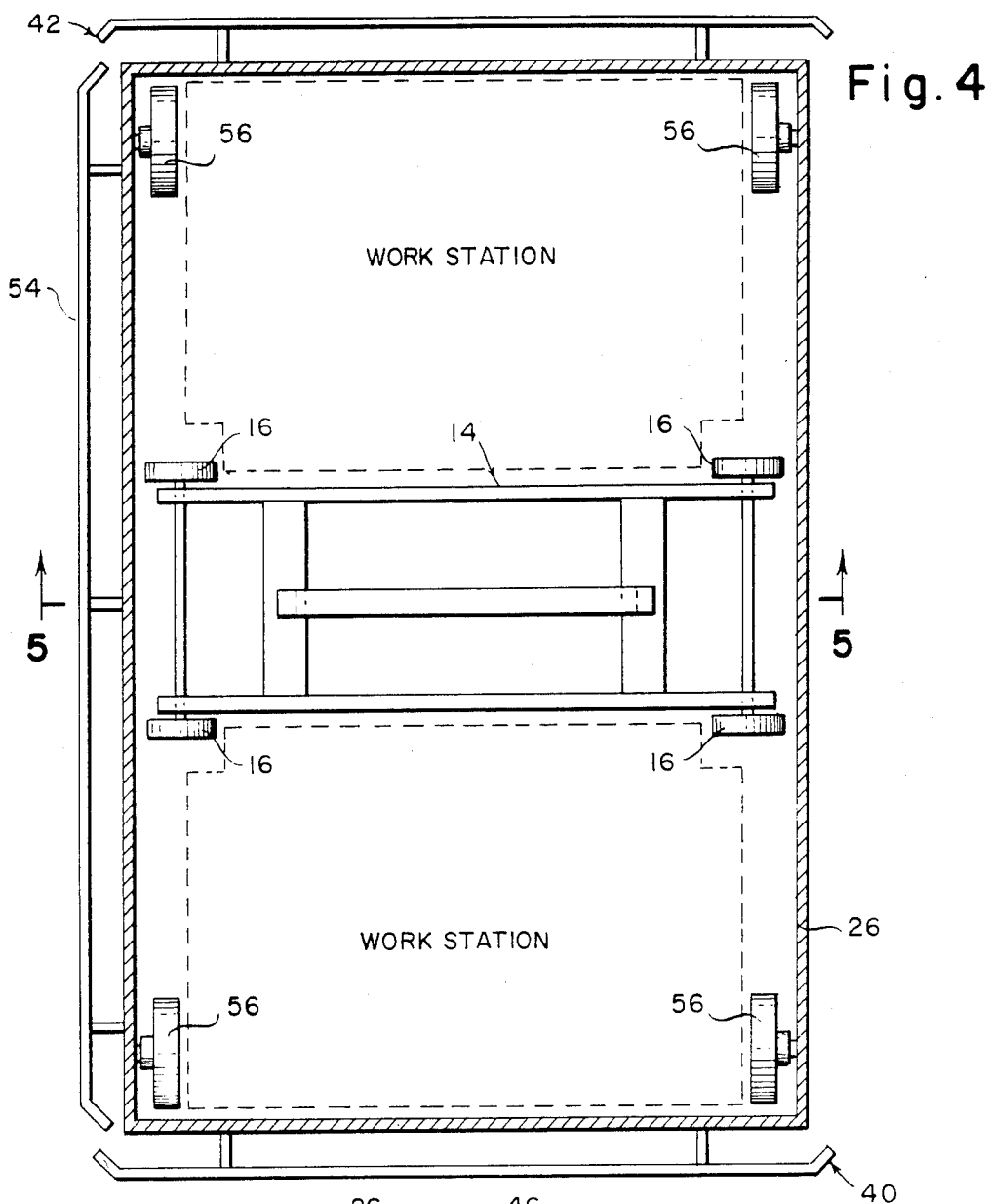
FIG. 4 is a horizontal cross section of the lower portion of the apparatus showing the arrangement of the first and second sets of wheels which carry the apparatus.
Figure 5:
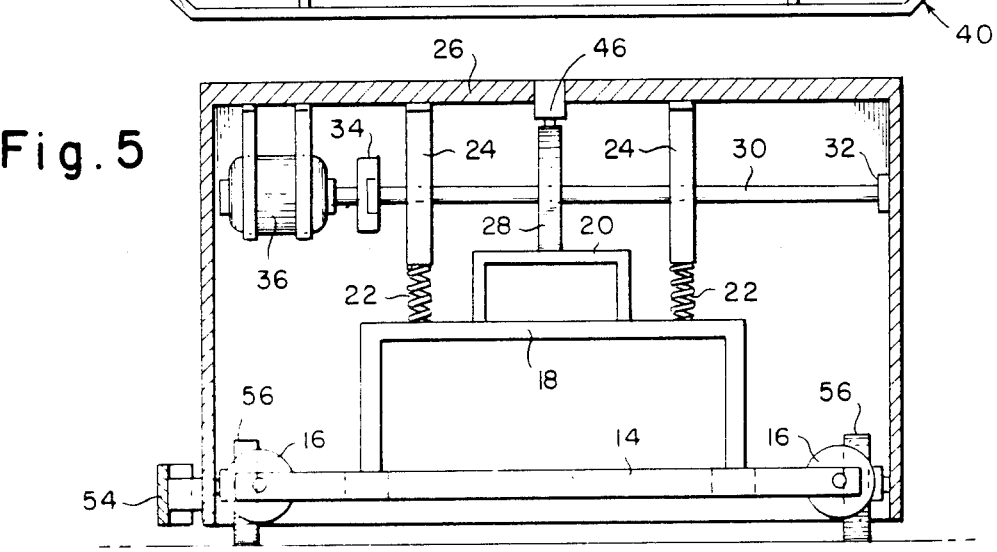
FIG. 5 is a cross section taken on the line 5—5 of FIG. 4.

Referring more particularly to the drawings, and starting with a consideration of FIGS. 4 and 5, the apparatus of this invention is normally carried by the first set of wheels 56 which are attached to support frame 26. The floor treating mechanism is supported from the frame 26 and this mechanism may contact or come close to the floor or a rug thereon within the designated work stations shown in FIG. 4. The second set of wheels 16 are carried by frame 14 which is mounted for vertical movement with respect to the frame 26 by means of brackets 24 and tension springs 22, as shown in FIG. 5. The second set of wheels is normally carried by the springs 22 in a retracted position, but may be forced downwardly by the rotation of cam 28 against bearing plate 20 mounted on bracket 18 so that the second wheels 16 bear against the floor and thereby lift support frame 26, thus lifting the first set of wheels 56 out of contact with the floor. Upon further rotation of cam 28, pressure on bearing plate 20 is relieved, and springs 22 retract the second set of wheels. This lowers frame 26 until wheels 56 are once more in contact with the floor to support the entire apparatus.

Figure 1:
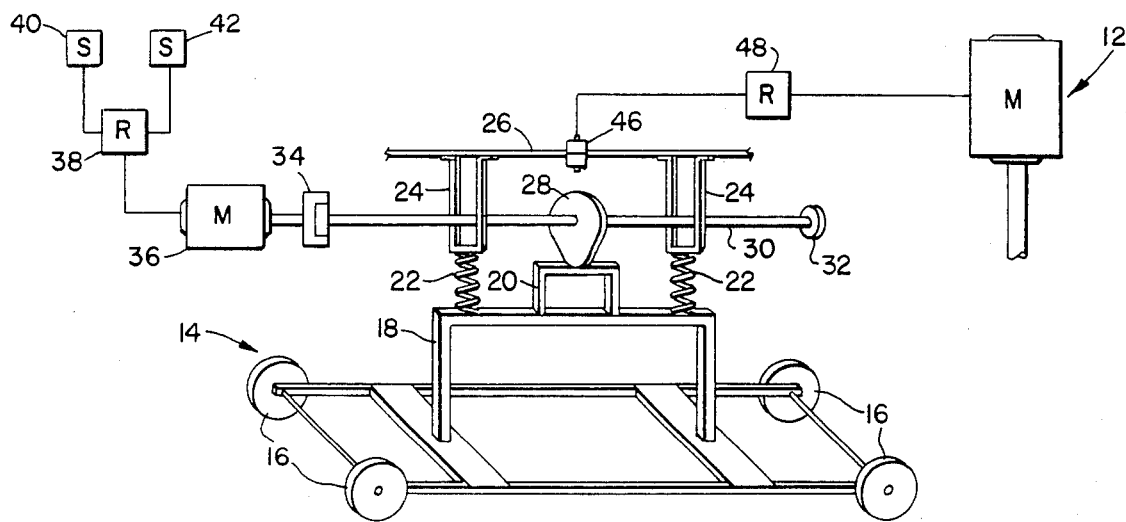
FIG. 1 is a diagrammatic view, partly in perspective, and showing that portion of the apparatus which is associated with the second set of wheels. This view shows the secondary wheels forced downwardly so they will contact the ground and drive the apparatus laterally.
Figure 2:
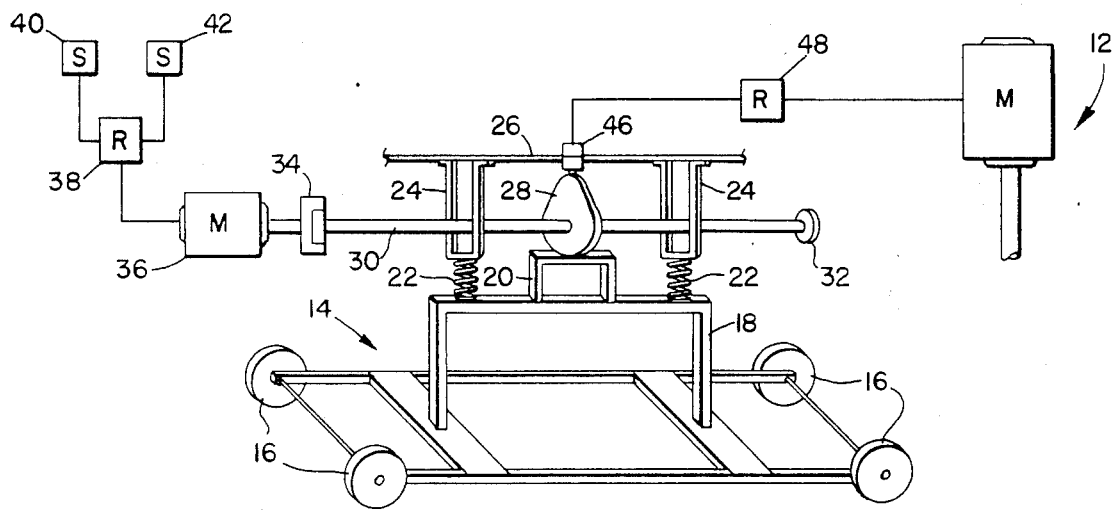
FIG. 2 is similar to FIG. 1 and shows the same structure in a wheel-retracted position with the first motor being activated to move the apparatus in a forward or rearward direction.

Referring now to FIGS. 1 and 2, the operation of the second set of wheels 16 is shown. It will be seen that the camshaft 30 is attached at one end to the body of the apparatus (see FIG. 5 for this) by bearing 32 and at the other end is connected to the second motor 36 through a fluid coupling 34 which eases the strain imposed on the motor. When the second motor 36 is activated, camshaft 30 rotates the attached cam 28 to cause it to press against bearing plate 20 which lowers the second set of wheels 16, as previously noted. The second motor 36 also powers the second set of wheels 16 to move the apparatus in a lateral direction. The connection of motor 36 to wheels 16 is not shown, but may be by way of a flexible cable drive or by a belt and pulley arrangement.

FIG. 1 shows the position of the various parts after completion of a one-half rotation of the cam 28 away from the microswitch 46 so as to depress bracket 18 to lower wheels 16. Upon further rotation of cam 28, the second set of wheels 16 is retracted, as previously described, and the parts are brought into the position shown in FIG. 2. At this point, the lobe or high point of the cam 28 closes microswitch 46 which activates the main motor 12 via relay 48 to drive the first set of wheels 56. Again, the drive mechanism is not shown, and it may be a flexible cable drive or a belt and pulley drive, as desired.

When the cam 28 is in the FIG. 1 position, the lowered set of wheels 16 engages the floor and supports the apparatus, and these wheels 16 are driven by the second motor 36 to move the apparatus laterally for a distance determined by the ratio of action between cam 28 and the wheels 16. When the lateral movement is complete, the wheels 16 are retracted, and the lobe of cam 28 closes microswitch 46 to activate motor 12, as previously noted. This causes the first set of wheels 56 to move the apparatus in a forward or rearward direction across the floor. Motor 12 is desirably a reversible motor for this purpose, and it continues to operate until after a sensor is contacted to turn on motor 36 which moves cam 28 to turn off the motor 12.

It will be noted that the apparatus moves a short distance after one of the sensors is contacted by an obstruction, and this is accommodated by having the sensor extend a short distance ahead of or behind the apparatus.

Figure 3:
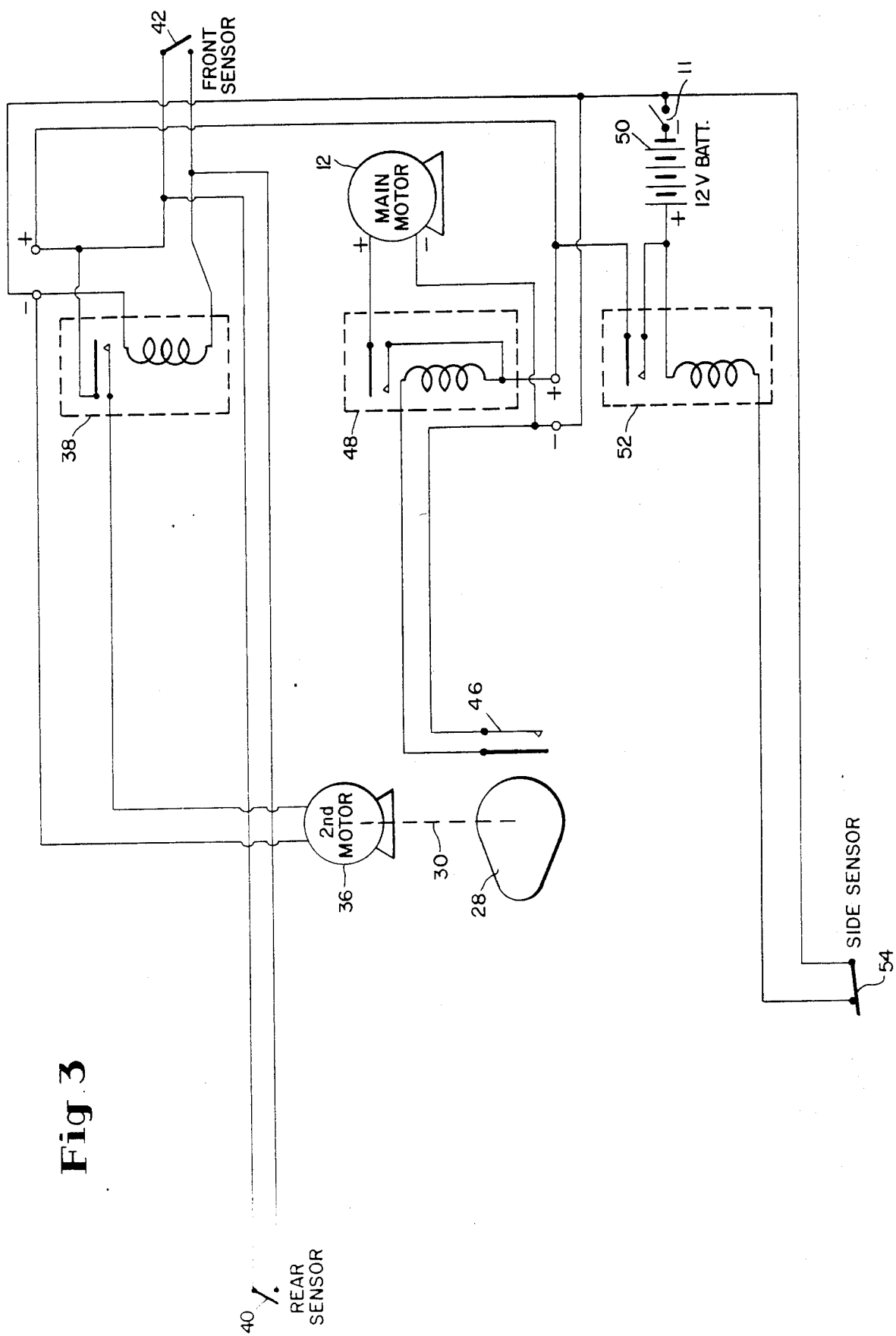
FIG. 3 is a schematic diagram of the electrical system showing the interaction of the circuitry of the motors, relays, switches, and sensors.

To start the apparatus which is positioned at one side of a room, and referring to FIG. 3, when manually operated switch 11 is turned on, relays 48 and 52 are closed, and the main motor 12 is activated. This drives the first set of wheels 56 to move the apparatus in a first direction across the floor. When the sensor makes contact with an obstruction, the normally open sensor is closed, and this activates relay 38 to cause motor 36 to operate, as previously described.

When the floor treatment task is completed, the apparatus has reached the wall opposite its starting position, and a normally closed side sensor 54 is opened by contact with that opposite wall. This sends a signal to relay 52 which turns the entire apparatus off.

It will be appreciated that one can employ battery operation or employ a direct connection to a wall outlet so long as the electrical connection is kept taut and well above the floor so as not to interfere with the treating operation. The battery is preferably rechargeable, and it is recharged when the apparatus is not in use.

What is claimed is:

1. Apparatus for automatically treating a floor or material on a floor, comprising:
   a support frame;
   floor treating means carried by said support frame;
   a first set of wheels carried by the support frame for moving said apparatus along a first path of movement;
   a second set of wheels movably supported on the apparatus for movement toward and away from the floor, and oriented to move the apparatus along a second path of movement at a right angle to the first path;
   elevating means for moving the second set of wheels upwardly and downwardly relative to the floor to alternately engage and disengage the first and second sets of wheels with the floor to cause the apparatus to alternately move along the first and second paths of movement;
   first motor means for driving the first set of wheels;
   second motor means for driving the second set of wheels and the elevating means; and
   control means for controlling operation of said first and second motor means and said elevating means, including sensor means at opposite ends and at one side of the apparatus for sensing an obstruction, said control means being operative upon sensing an obstruction at either end of the apparatus, when the first set of wheels are in contact with the floor and the apparatus is moving along said first path of movement, to turn on said second motor means and turn off said first motor means, said second motor means being operatively connected to operate said elevating means to move said second set of wheels into contact with the floor to lift the support frame and first set of wheels from the floor and to drive the second set of wheels to move the apparatus along the second path of movement for a predetermined time, said control means being operative at the end of said predetermined time to elevate said second set of wheels and enable said first set of wheels to contact the floor, and to turn off said second motor means and turn on said first motor means to once again cause said apparatus to move along said first path of movement.

2. Apparatus as recited in claim 1 in which said sensor means are normally open and are closed, when contacted, to turn said second motor means on, said sensor means opening when contact is released, to turn said second motor means off.

3. Apparatus as recited in claim 2 in which said apparatus includes a normally closed side sensor which shuts off the apparatus when contacted.

4. Apparatus as in claim 1, wherein:
   said control means and first motor means are operative to drive said first set of wheels in an opposite direction each time the first motor means is turned off and then turned on again.

5. Apparatus as in claim 1, wherein:
   said second set of wheels are carried by a second support frame movably carried by said support frame for up and down movement relative thereto;
   yieldable means are connected with said second support frame, urging it upwardly; and
   said elevating means includes cam means driven by said second motor means and engageable with said second support frame to urge it downwardly.

6. Apparatus as in claim 1, wherein:
   said control means includes switch means operable by said cam means at the end of said predetermined time to turn off said second motor means turn on said first motor means.

7. Apparatus as recited in claim 6 in which said apparatus includes a normally closed side sensor which shuts off the apparatus when contacted.

* * * * *